United States Patent [19]
Örnerfors

[11] Patent Number: 5,878,692
[45] Date of Patent: Mar. 9, 1999

[54] APPARATUS AND METHOD FOR MONITORING ANIMALS

[75] Inventor: Benny Örnerfors, Järfälla, Sweden

[73] Assignee: Alfa Laval AGRI AB, Tumba, Sweden

[21] Appl. No.: 860,135

[22] PCT Filed: Dec. 22, 1995

[86] PCT No.: PCT/SE95/01569

§ 371 Date: Jun. 27, 1997

§ 102(e) Date: Jun. 27, 1997

[87] PCT Pub. No.: WO96/19915

PCT Pub. Date: Jul. 4, 1996

[30] Foreign Application Priority Data

Dec. 28, 1994 [SE] Sweden .................................. 9404539

[51] Int. Cl.⁶ .................................................. A01J 5/017
[52] U.S. Cl. .................................. 119/14.08; 119/14.02; 119/14.18
[58] Field of Search .............................. 119/14.02, 14.08, 119/14.1, 14.18, 718

[56] References Cited

U.S. PATENT DOCUMENTS

| | | | |
|---|---|---|---|
| 2,660,976 | 12/1953 | Hein | 119/14.08 |
| 3,608,524 | 9/1971 | Waltz | 119/718 |
| 4,947,795 | 8/1990 | Farkas | 119/718 |
| 5,042,428 | 8/1991 | Van Der Lely et al. | 119/14.18 X |
| 5,195,455 | 3/1993 | Van Der Lely et al. | 119/14.03 X |
| 5,474,023 | 12/1995 | Khodabandehloo et al. | 119/14.1 |
| 5,524,572 | 6/1996 | Dessing et al. | 119/14.02 |
| 5,666,903 | 9/1997 | Bull et al. | 119/14.08 X |
| 5,697,326 | 12/1997 | Mottram et al. | 119/14.14 X |

FOREIGN PATENT DOCUMENTS

| | | |
|---|---|---|
| 0 091 087 | 10/1983 | European Pat. Off. . |
| 0 534 564 | 3/1993 | European Pat. Off. . |
| 0 595 409 | 5/1994 | European Pat. Off. . |
| 9419931 | 9/1994 | WIPO . |

Primary Examiner—Michael J. Carone
Assistant Examiner—Elizabeth Shaw
Attorney, Agent, or Firm—Hovey, Williams Timmons & Collins

[57] ABSTRACT

An apparatus for monitoring an animal in a stall comprises a sound sensing device arranged to sense sounds in the vicinity of the animal. A control unit is adapted to control an animal related action device, such as an attachment means for automatically attaching teatcups to the teats of an animal, such that it performs an action in a predetermined manner in response to said sensed sound.

8 Claims, 3 Drawing Sheets

APPARATUS AND METHOD FOR MONITORING ANIMALS

TECHNICAL FIELD OF THE INVENTION

The present invention relates to an apparatus for monitoring an animal in a stall.

Furthermore, it relates to a method of monitoring an animal in a stall.

BACKGROUND OF THE INVENTION

Automatic milking of animals is disclosed in EP-A-91 892. The automatic milking takes place in one or more combined feeding and milking stalls provided in a barn in which the animals are allowed to walk about freely and find their way individually to the stalls for feeding, drinking and milking. The animals are automatically identified in each stall and fed with the aid of a computer connected to the identification and feeding means used. By means of the computer, in which facts concerning each animal, when she was last milked, etc are stored, automatic milking is initiated. The stall also comprises retaining gates which are automatically closed to retain the animal during milking and opened to let the animal leave the stall.

Traditionally, animals are milked twice a day. Because of high labour costs it was not interesting to increase the number of milkings per day as long as milking was performed manually. It is however recognised that milking an animal three to four times a day has proven to be less detrimental to her, since the udder is not filled to its maximum between each milking. Such a milking procedure also corresponds more closely to the behaviour of the calves and therefore results in healthier animals. As a side effect, however, it is possible to increase the total milk production from one animal by 15–25%. By means of automatic milking machines it is not only possible, but would also be economically interesting to milk the animals more often than twice a day, since the labour cost is no longer critical. In this case it is rather the high investment cost which is a limiting factor.

DE-C-3 702 465 discloses a system for automatic milking and feeding of animals.

A problem of prior art automatic milking systems is their lack of reliable equipment for monitoring the animal in the stall, in order to enable immediate actions to take place in case disturbances of any kind should occur.

SUMMARY OF THE INVENTION

The object of the present invention is to provide a reliable method and apparatus for monitoring an animal in a stall.

The present invention also resides in the insight that the animals stay to the flock, and are therefore reluctant to be left alone e.g. in a milking station; they may get worried or even be seized by panic.

This object is obtained by the apparatus initially defined, which is characterised in that a sound sensing means is arranged to sense sounds in the vicinity of the animal, wherein a control unit is adapted to control an animal related action means in response to said sound sensing means, sensing an inadmissible sound, such that said action means performs an action in a predetermined manner.

The object is also obtained by the method of the initially stated kind, which is characterised by the steps of:

sensing sounds in the vicinity of the animal by means of a sensing means, and controlling an animal related action means in response to the sensing means sensing an inadmissible sound in such a way that said action means performs an action in a predetermined manner.

Preferably, the apparatus comprises an automatic milking machine having teatcups to be attached to the teats of an animal, and said animal related action means comprises attachment means for automatically attaching at least one of the teatcups to a teat, wherein the sound sensing means is arranged to sense sounds created in the vicinity of a teatcup when the teatcup is attached to the teat by means of said attachment means, and the control unit is adapted to control the attachment means to detach the teatcup from and reattach the teatcup onto the teat in response to the sound sensing means sensing an inadmissible attachment sound indicating an incorrect teatcup attachment. Hereby, a reliable automatic milking machine is achieved.

Suitably, a sound comparator connected to the sound sensing means is adapted to compare the sound created in the vicinity of the teatcup with recorded sounds created during correct attachment of the teatcup to the teat, in order to establish incorrect attachment of the teatcup onto the teat. Hereby, an even more reliable milking machine is achieved.

Advantageously, a sound comparator connected to the sound sensing means is adapted to compare the sound created in the vicinity of the teatcup with recorded sounds created during incorrect attachment of the teatcup onto the teat. Hereby, the risk for incorrect attachment is diminished.

Alternatively, the apparatus comprises an automatic milking machine having teatcups to be attached to the teats of an animal, and said animal related action means comprises attachment means for automatically attaching at least one of the teatcups to a teat, wherein the sound sensing means is arranged to sense sounds created by the animal, and the control unit is adapted to control the attachment means to detach each teatcup from the animal in response to the sound sensing means sensing an inadmissible sound. Hereby is avoided that the animal in panic destroys the milking equipment.

Preferably, a sound comparator connected to the sound sensing means is adapted to compare the sound created by the animal with at least one recorded inadmissible sound created by an animal.

Alternatively, the apparatus comprises an automatic milking machine having teatcups to be attached to the teats of an animal, and said animal related action means comprises attachment means for automatically attaching at least one of the teatcups to a teat, wherein the sound sensing means is arranged to sense sounds created by the animal, and the control unit is adapted to control the attachment means not to attach the teatcup onto the teat of the animal in response to the sound sensing means sensing an inadmissible sound. Hereby, the milking equipment is protected from damages by a animal, which might panic.

Advantageously, said animal related action means comprises at least one gate, which automatically opens in response to the sound sensing means sensing said inadmissible sound. Hereby, the animal is allowed to leave the milking station, so that the milking equipment is protected and the animal can calm down, if it is in panic.

DRAWING SUMMARY

Preferred embodiments of the present invention will now be described with reference to the accompanying drawings in which:

FIG. 1 shows a perspective view of a milking station, including an apparatus of the invention, FIG. 2 shows a schematical view from above of the milking station of FIG. 1, and FIG. 3 shows a teatcup and an attachment means for attachment thereof onto teats of an animal.

DETAILED DESCRIPTION OF PREFERRED EMBODIMENTS

Figure 1:
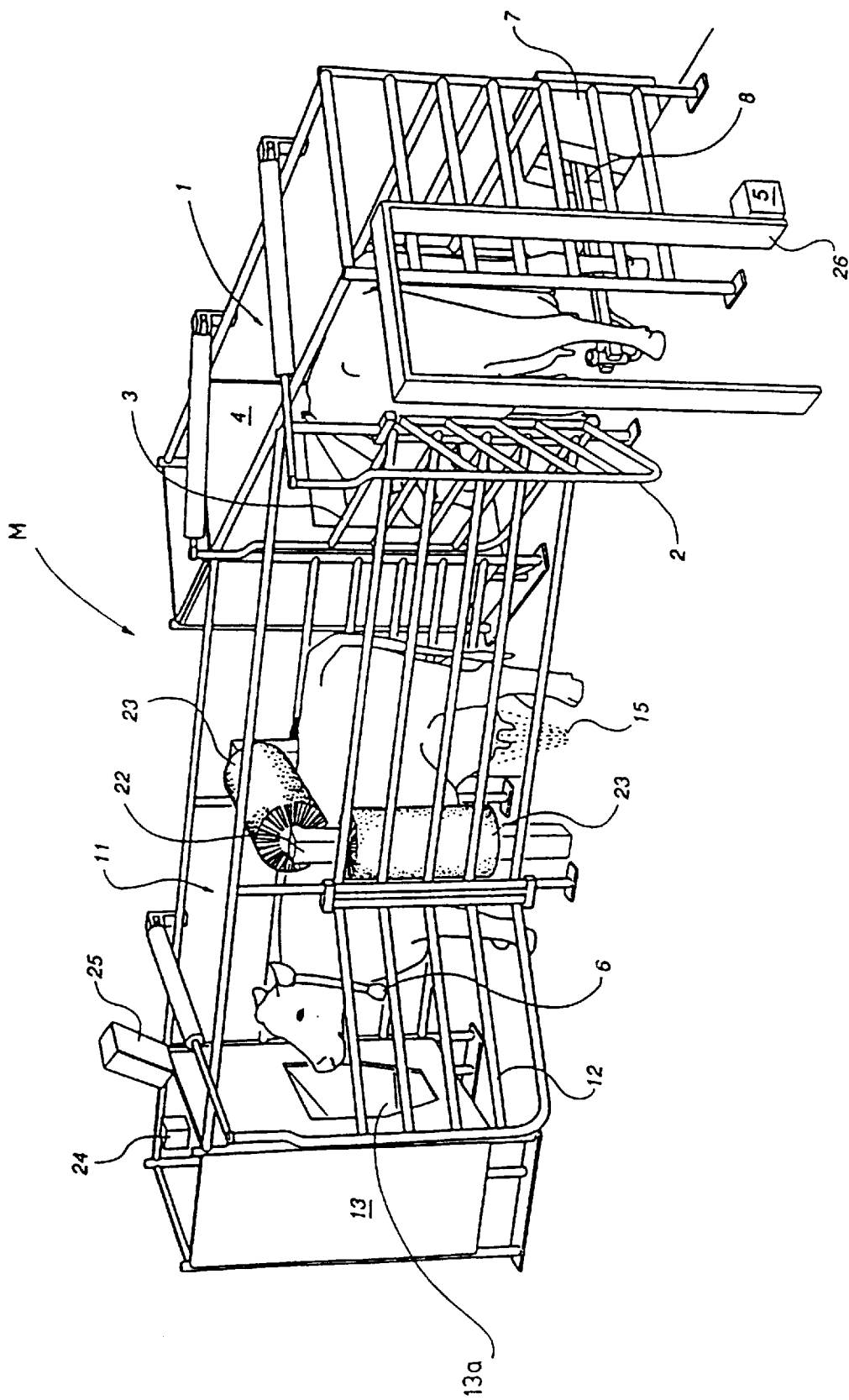
Figure 2:
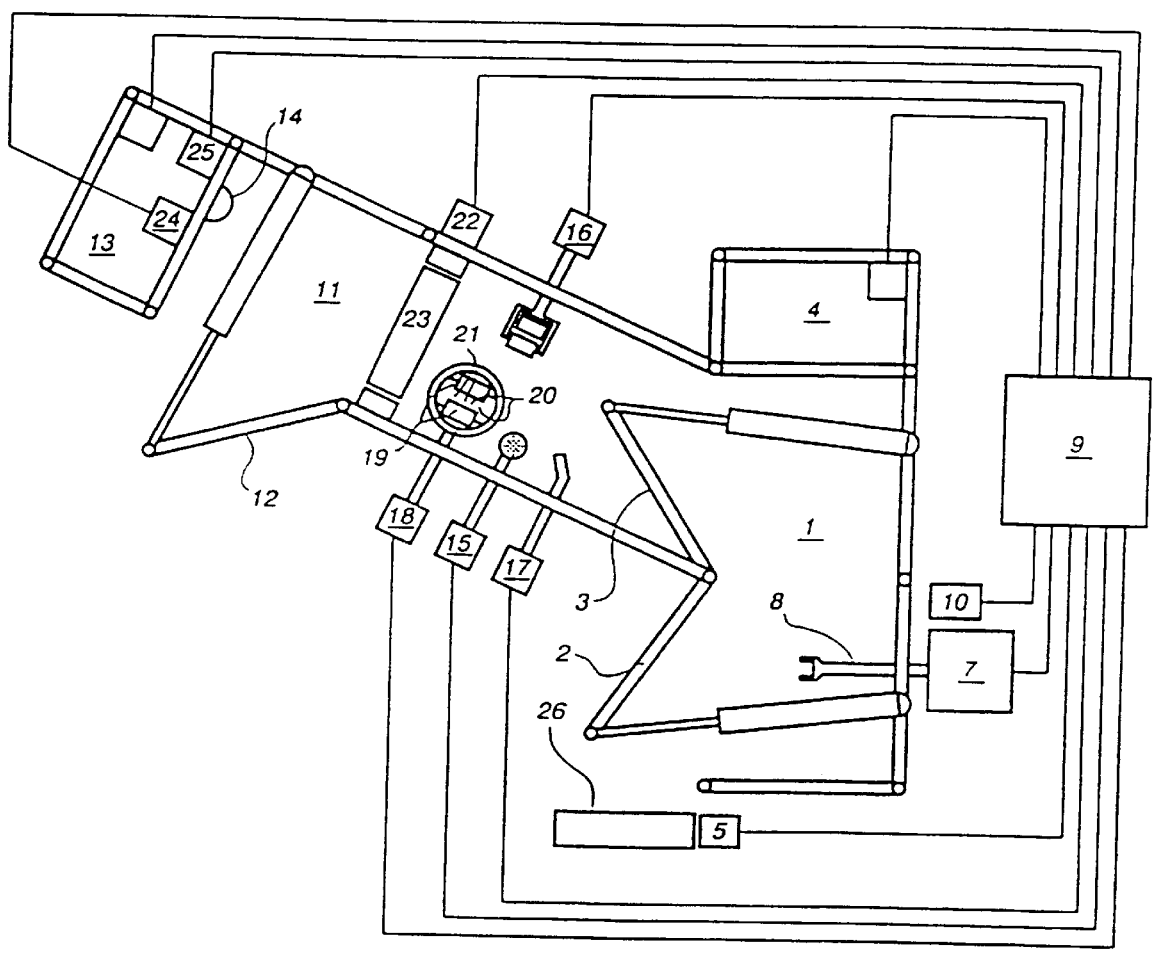

Referring to the FIGS. 1 and 2, a milking station comprises a milking stall 1 having an entrance gate 2 and an exit gate 3. In the milking stall 1, there is provided a feeding device 4 for feeding the animal during milking, e.g. with concentrate or silage. At the entrance of the milking stall 1 an identification device 5 is provided, which identifies a transponder 6 carried by the animal entering the stall 1. Just outside the milking stall 1 there is provided an automatic milking machine 7 which may include a sensor (not shown) for determining the position of the teats and which comprises a robot arm 8 supporting the milking cluster including the teat cups to be applied to the teats of the animal. In connection with the automatic milking machine 7 there is also provided a control device 9 and an examination device 10. The function of the control device 9 and the examination device 10 will be explained further below.

Outside the exit gate 3 there is provided a treatment stall 11, which the animal must pass after leaving the milking stall 1. The exit gate 3 of the milking stall 1 also constitutes the inlet gate of the supply means 11. Moreover, the treatment stall 11 comprises an exit gate 12 of the type which suitably, but not necessarily, can be opened by the animal herself.

In the treatment stall 11 there is provided an enticing means comprising various enticing devices for enticing the animal to move from the milking stall 1 into the treatment stall 11, when milking is finished or when the animal should leave the milking stall 1 for some other reason. There are a great number of possibilities to design such enticing devices. The following list comprises many such possibilities but it is, however, not complete.

In the treatment stall 11, there is provided a supply means 13 which can offer the animal feed in the form of e.g. concentrate or silage from a feed supply device 13a as well as fresh drinking water from a water supply device 14.

Furthermore, there is provided a cleaning device 15, which may comprise means for spraying warm water onto the udder and the teats of the animal for reasons of cleanliness or a device 16 for mechanical cleaning of the teats and the udder without the use of water. Moreover, there is provided a device 17 for spraying warm air on the animal, in particular on the udder and the teats. Furthermore, a combination device 18 comprising rotating brushes 19 for mechanically cleaning and massageing of the teats, spray nozzle devices 20 for delivery of a cleaning agent, and one or more nozzle devices 21 for delivery of drying air to the teats.

Furthermore, a dressing device 22 is provided in the treatment stall 11. This comprises one or more motor driven, rotating brushes 23 for dressing and massageing the body of the animal.

Furthermore, there is provided a smell generating device 24, which is adapted to spread smelling substances attractive to the animal, e.g. the smell of a bull.

Since many animals are attracted by music, it is also possible to provide a sound generating device, e.g. a loudspeaker 25, in the stall 11.

Figure 3:
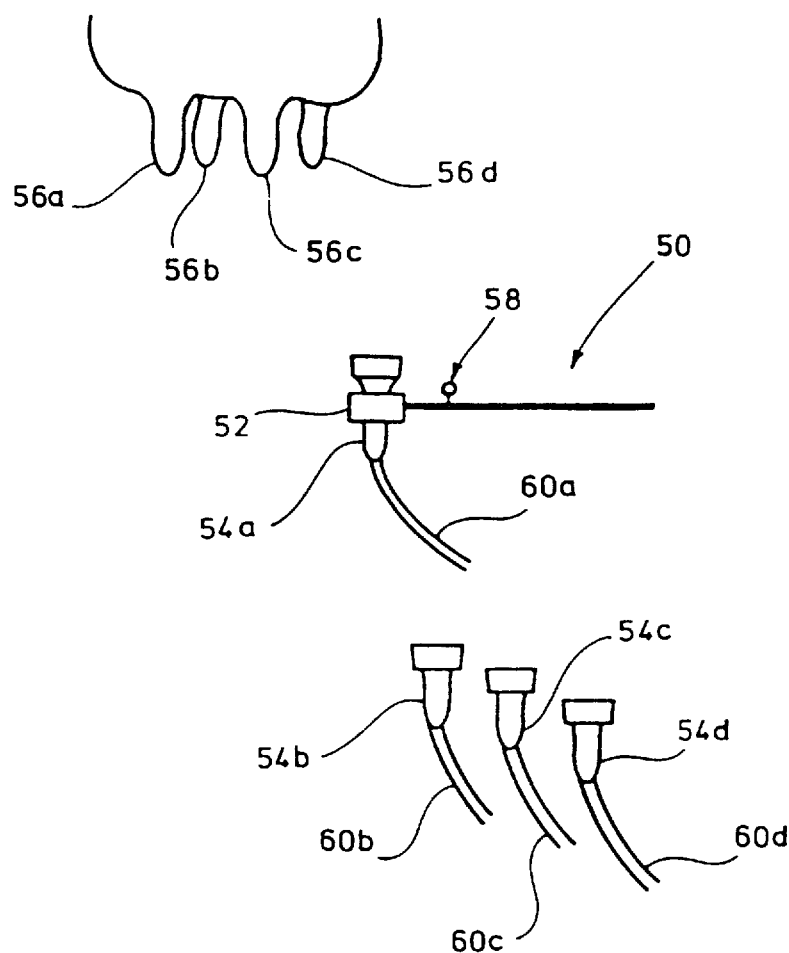

FIG. 3 illustrates an animal related action means comprising an attachment means 50 including said robot arm 8 and a retaining means 52, which holds a teatcup 54a to be attached onto a teat 56a of an animal. A sound sensing means in the form of a microphone 58 is arranged on the arm 8 for sensing sounds generated in the vicinity thereof.

It should be noted that the teatcups 54a, 54b, 54c, 54d with milk tubes 60a, 60b, 60c, 60d, are parts of the automatic milking machine 7, comprising i.a. at least one milk meter, a milk pipeline, a milk tank and a source of vacuum connected to the milk pipeline. It should also be noted that the attachment means 50 further comprises parts of a milking robot such as a basement, sensors, control equipment etc.

According to a first aspect of the invention, a sound sensed by the microphone 58 during attachment of the teatcup to a teat is transmitted to a comparator which compares the sensed sound with recorded admissible sounds of proper attachment of the teatcup 54a–d to the teat 56a–d. The normal sound created when properly attaching a teatcup to the teat of an animal is distinct and caracteristic while applying a vacuum in the teat cup.

According to a second aspect of the invention, the comparator not only contains recorded sounds of correctly attached teatcups to the teat of an animal, but also inadmissible sounds created when a teatcup has not been correctly attached to the teat of an animal.

Accordingly, the sound of a teatcup, attached to a folded teat while applying a vacuum in the teat cup, is soughing rather than distinct. This also relates to teatcups attached to the side of the udder or to the fleece or to the body of the animal.

The comparator will then immediately recognise different situations where the teatcup needs to be re-attached to the teat of the animal.

According to a third aspect of the invention, also other inadmissible sounds may be recorded in the sound comparator, such as alarming sounds from a relevant animal in pain or panic.

For this purpose, a further sound sensing means in the form of a microphone 58 may be arranged in the vicinity of the head of the animal.

Thus, in case the microphone 58 senses said alarming sounds, the milking operation or the attachment operation should immediately be interrupted and the animal should be allowed to leave the milking station by opening the gates 3 and 6.

Preferably, a signal is also sent to the milker in case inadmissible sounds are created indicating that the animal needs help. As a further assistance to the milker, the signal may also start at least one video camera, so that the reason for the discomfort of the animal can be studied.

According to a fourth aspect of the invention, the sound sensing means is adapted to sense sounds in a stall not being equipped with a milking machine at all. This may be the case when a cow is about to calve, and it rests in a calving stall. This may also be the case when the cow is in the treatment stall 11. If an inadmissible sensed sound is sensed, the animal should immediately be allowed to leave the stall. This is accomplished by opening an outlet gate in response to said signal.

Wherever the expression "animal" has been used above, it is to be understood that any animal, which can be milked is meant, such as cows, sheep, goats, buffalos and horses.

I claim:

1. An apparatus for monitoring an animal in a stall comprising:

a sound sensing means arranged to sense sounds in the vicinity of the animal;

an animal related action means;

a control unit for controlling the animal related action means in response to said sound sensing means sensing an inadmissible sound, such that said action means performs an action in a predetermined manner; and an automatic milking machine having teatcups to be attached to the teats of an animal, wherein said animal related action means comprises attachment means for automatically attaching at least one of the teatcups to one of the teats, wherein the sound sensing means is arranged to sense sounds created in the vicinity of a teatcup when the teatcup is attached to the teat by means of said attachment means, and the control unit is adapted to control the attachment means, and the control unit controls the attachment means to detach the teatcup from and reattach the teatcup onto the teat in response to the sound sensing means sensing an inadmissible sound indicating an incorrect teatcup attachment.

2. An apparatus according to claim 1, further including a sound comparator connected to the sound sensing means for comparing the sound created in the vicinity of the teatcup with recorded sounds created during correct attachment of the teatcup to the teat, in order to establish incorrect attachment of the teatcup onto the teat.

3. An apparatus according to claim 1, further including a sound comparator connected to the sound sensing means for comparing the sound created in the vicinity of the teatcup with recorded sounds created during incorrect attachment of the teatcup onto the teat.

4. An apparatus for monitoring an animal in a stall comprising:

a sound sensing means arranged to sense sounds in the vicinity of the animal;

an animal related action means;

a control unit for controlling the animal related action means in response to said sound sensing means sensing an inadmissible sound, such that said action means performs an action in a predetermined manner; and an automatic milking machine having teatcups to be attached to the teats of an animal, and wherein said animal related action means comprises attachment means for automatically attaching at least one of the teatcups to a teat, and wherein the sound sensing means is arranged to sense sounds created by the animal, and the control unit controls the attachment means to detach each teatcup from the animal in response to the sound sensing means sensing an inadmissible sound.

5. An apparatus according to claim 4, including a sound comparator connected to the sound sensing means for comparing the sound created by the animal with at least one recorded inadmissible sound created by the animal.

6. An apparatus according to claim 4, wherein said animal related action means comprises at least one gate which automatically opens in response to the sound sensing means sensing said inadmissible sound.

7. An apparatus for monitoring an animal in a stall comprising:

a sound sensing means arranged to sense sounds in the vicinity of the animal;

an animal related action means;

a control unit for controlling the animal related action means in response to said sound sensing means sensing an inadmissible sound, such that said action means performs an action in a predetermined manner; and an automatic milking machine having teatcups to be attached to the teats of an animal, and wherein said animal related action means comprises attachment means for automatically attaching at least one of the teatcups to a teat, and wherein the sound sensing means is arranged to sense sounds created by the animal, and the control unit controls the attachment means not to attach the teatcup onto the teat of the animal in response to the sound sensing means sensing an inadmissible sound.

8. A method of monitoring an animal in a stall, comprising the steps of:

sensing sounds in the vicinity of the animal by means of a sound sensing means; and controlling an animal related action means in response to the sensing means sensing an inadmissible sound in such a way that said action means performs an action in a predetermined manner, wherein sounds created in the vicinity of a teatcup are sensed when the teatcup is attached to a teat of the animal and the teatcup is detached from and reattached onto the teat in response to the sound sensing means if the latter senses an inadmissible attachment sound.

* * * * *